US007998366B2

(12) United States Patent
Howard

(10) Patent No.: US 7,998,366 B2
(45) Date of Patent: Aug. 16, 2011

(54) METHOD OF RAISING THE FLASH POINT OF VOLATILE ORGANIC COMPOUNDS

(75) Inventor: Harry W. Howard, Little Egg Harbor, NJ (US)

(73) Assignee: GreenSolve, LLC, Binghamton, NY (US)

( * ) Notice: Subject to any disclaimer, the term of this patent is extended or adjusted under 35 U.S.C. 154(b) by 272 days.

(21) Appl. No.: 12/361,802

(22) Filed: Jan. 29, 2009

(65) Prior Publication Data

US 2010/0187477 A1 Jul. 29, 2010

(51) Int. Cl.
*C09K 3/00* (2006.01)
*C10L 1/182* (2006.01)
*C11D 7/50* (2006.01)

(52) U.S. Cl. ..................... 252/364; 252/182.29; 44/452; 44/451; 510/407

(58) Field of Classification Search .................... 44/452, 44/451; 252/364, 182.29; 510/407, 411

See application file for complete search history.

(56) References Cited

U.S. PATENT DOCUMENTS 3,705,941 A * 12/1972 Hennart et al. ............... 514/136
3,867,526 A * 2/1975 Hennart et al. ............... 514/136
5,393,451 A * 2/1995 Koetzle ......................... 510/365
5,425,893 A * 6/1995 Stevens ............................. 134/1
6,843,812 B2 * 1/2005 Stephanos ....................... 44/266
7,176,174 B2 2/2007 Flippini et al.
7,273,839 B2 9/2007 Koetzle
7,309,684 B2 12/2007 Flippini et al.
7,833,959 B1 * 11/2010 Koetzle ......................... 510/407
2005/0100823 A1 * 5/2005 Hendrickson et al. ........ 430/300
2006/0081822 A1 * 4/2006 Koetzle ......................... 252/601
2008/0271761 A1 11/2008 Sherrel et al.
2010/0187478 A1 * 7/2010 Howard ........................ 252/364
2010/0247784 A1 * 9/2010 Koetzle ......................... 427/386

OTHER PUBLICATIONS

"Clean Cities of Middle Tennessee"; Article (online) Apr, 5, 2008, [retrieved on Feb. 21, 2010]; Retrieved from the Internet: ,<URL: http://web.archive.org/web/20080405060339/http://www.tennesseecleanfuels.org/Methanol.html > para [0001]-[0002]; 2 pages.

Cargill Dow and Ashland Sign Ethyl Lactate Agreement: Green Solvents from Renewable Resources; Article [online]; Business Wire, Apr. 23, 2002, [retrieved on Feb. 22, 2010]; Retrieved from the Internet: URL; http//www.allbusiness.com/electronics/electronics-overview/5935032-1.html> para [0003]; 3 pages.

International Search Report and Written Opinion for PCT/US10/21350; dated Mar. 3, 2010; 9 pages.

* cited by examiner

*Primary Examiner* — Joseph D Anthony

(74) *Attorney, Agent, or Firm* — Brown & Michaels, PC

(57) ABSTRACT

The flash points of volatile organic compounds are raised by using from about 0.05 to 5.0 wt. % of a combination of two or more terpene alcohols to allow the blended compound to have a higher flash point. In contrast to heavier loadings, the lower loading of two or more terpene alcohols to a VOC has been found to increase the range of uses for such compounds and as well as increasing the shelf life of the VOC.

10 Claims, No Drawings

METHOD OF RAISING THE FLASH POINT OF VOLATILE ORGANIC COMPOUNDS

FIELD OF THE INVENTION

The invention pertains to the field of organic solvents. More particularly, the invention pertains to adding a combination of terpene alcohols to volatile organic compounds to increase their flash points and expand the uses for which these volatile solvents can be used.

BACKGROUND OF THE INVENTION

Organic solvents, such as acetone, xylene, ketones, aromatic hydrocarbons, such as benzene, esters, aliphatic hydrocarbons and ethers are widely used as additives for industrial and commercial purposes. Due to the high volatility of these compounds, their uses are regulated by many countries' governmental agencies. In the United States, the Environmental Protection Agency (EPA) and the Department of Transportation (DOT) have classified these compounds based on their volatilities or "flash points". For example, Acetone has a flash point of 0° F. and is classified a flammable, thereby limiting its scope of uses.

The EPA and DOT Volatile Organic Compound ("VOC") classifications are as follows:

| | |
|---|---|
| Class I liquids (flammable) | flash point at or below 100° F. |
| Class II liquids (combustible) | flash point from 100° F. to below 140° F. |
| Class III liquids (combustible) | flash point above 140° F. to below 200° F. |

Obviously, the more flammable a solvent, the more restrictions exist on its use. Further, manufacturers that utilize solvents must handle the more flammable liquids more carefully and have to address issues involving atmospheric volatility and worker health concerns due to excessive exposure to these chemicals. If these solvents can be modified so that their flash points can be increased, this would result in significantly more uses for these compounds as well as increasing their shelf lives. It is desirable therefore to increase the flash point of a variety of solvents without substantially increasing the cost of the solvent while maintaining the solvent and its utility and effectiveness for its purpose.

DESCRIPTION OF RELATED ART

It is known that terpene alcohols can be added to volatile organic solvents to increase the flash points of these solvents. Many terpene alcohols have the chemical formula: $C10H18O$. Terpenoid is the general name given to this class of compounds which are characterized by a repeating carbon skeleton of isoprene. Terpenoids are derived from plants, trees, flowers and other vegetation. They come in the form of liquids, solids, waxes, oils and alcohols. Terpenoids are divided into groups determined by the number of carbon atoms and repeating isoprene units. They may be formed as acyclic, monocyclic or polycyclic structures.

Terpene alcohols in various forms have been used for centuries in fragrances due to their compatibility with other compounds and their minimal negative environmental impact. The flavor and fragrance industries divide terpineols, which are a type of terpene alcohol, into Alpha-, Beta- or Gamma-Terpineols, with Beta-Terpineol being non-naturally occurring. Terpene alcohols have been used for other purposes, such as disinfectants, cleaning compounds, soaps, cosmetics and colognes. They are also known to add, enhance or mask the odor of products which perhaps might be offensive to humans or animals.

U.S. Pat. No. 7,273,839 B2 discloses the use of alpha terpineols with organic solvents and blends of solvents to increase the flash points of these solvents. The patent discloses that the addition of at least 10%, by weight, of alpha terpineols to a single solvent or combination of solvents increases the flash point of the blended compound. They show examples and claim that at least 5% alpha terpineol increases the flash points of specific solvents to useful levels. In one example, they claim that by adding 18 wt % of alpha terpineol to acetone, they increased the solvent's flash point from 0° F. to 143.6° F. Excessive terpineol loadings (10-18%) causes rapid settling, poor shelf life which substantially adds to the cost of a solvent or combination of solvents. This is a costly method to raise flash points.

In testing conducted following the disclosure of the foregoing patent, the preferred blending of 14% to 18% terpineol by weight in Acetone does not yield a desirable outcome. The excessive loading of a single alpha terpineol results in paint and adhesive formulation problems from incompatibility with some key resins particularly during film formation and drying. The Acetone evaporates, leaving the heavy loading of terpineol behind. The terpineol acts as a diluent, phase separates, forming under the film, within the film, and upon the surface. The result for fast drying lacquers, vinyls, and similar coatings was complete rejection of the coating by the substrate. After 2-3 days of drying time the stressed films lifted and floated, having no adhesion or bond strength. Vinyls heavily loaded with terpineol perform the worst, because they are in solution and exhibit a low mole wt. during application. As soon as the Acetone evaporates (15 min), the film becomes stressed due to the higher mole wt. and simply delaminates from the surface. In this instance, a heavy loading of terpineol acts like a parting agent (or wax) thus preventing adhesion of the film to the substrate.

SUMMARY OF THE INVENTION

The flash points of volatile organic compounds are raised by using a minimal amount of terpene alcohols to allow the blended compound to have a higher flash point. This is achieved by using a low concentration of two or more terpene alcohols. This permits more uses for the VOC than would otherwise be expected based on their pure flash point. By adding only from about 0.05 to 5.0 wt. % of a combination of two or more terpene alcohols, the flash points of VOC's is increased, in some cases significantly, resulting in an increased range of uses for these compounds and also contributes to longer shelf life with negligible settling.

DETAILED DESCRIPTION OF THE INVENTION

From about 0.05 to 5.0 wt %, based on the total weight of the blended compound, of two or more terpene alcohols is added to volatile organic compounds in order to raise the flash points of these VOC's. The range of 2 to 3%, by weight, of the combined terpene alcohols is preferred. It has been discovered that lower amounts of terpene alcohols added actually improves the performance of the resulting compound in contrast to adding a significantly higher amount of terpene alcohols. An added benefit is that since terpene alcohols can be expensive, the less used, the less expensive is the ultimate compound.

Examples of terpene alcohols include geraniol, citronellol, nerol, menthol, nerolidol and farnesol. These compounds can be acquired from manufacturers such as Flavors and Fragrances, Inc. and Millennium Chemicals, Inc. Other compounds that can be used with this invention include acetates and esters.

The "low loading" of a combination of terpene alcohols significantly expands the uses to which the solvent can be applied. The small amount of multiple terpene alcohols can permit the formulator to "fine tune" the solvent formulation for use in a much wider area of uses that before. For example, these combination compounds can now successfully be used for expanded uses in the following industries. For the sake of being concise, TSB stands for the terpene alcohol/solvent blends according to the present invention.

1. Paints, Coatings and Finishes.
   a. TSB can dissolve or disperse resins and pigments into a homogenous solution for packaging and/or application.
   b. TSB offers a choice of solvent blends which determines paint appearance and dry time.
   c. TSB solubilizes and evaporates from the applied paint, reducing dry time and service restoration.
   d. TSB permits high-solids coatings for thick barrier protection.
   e. TSB facilitates packaging in bulk, container, and/or aerosols.
   f. TSB permits safe application of formerly explosive, flammable, exempt-voc solvents.
2. Printing Inks, Printing Press Maintenance.
   a. TSB more readily adjusts the printing ink viscosity and drying time.
   b. TSB permits cleaning of machined or polished press parts to remove inks without abrasive damage.
   c. TSB provides emissions compliance and safer use.
3. Adhesives
   a. TSB is used to prepare surfaces and render them clean prior to adhesive application.
   b. TSB may be incorporated into the adhesive formula to adjust viscosity and "tack time".
   c. TSB is often used to soften or remove adhesives without damaging the surfaces.
4. Pharmaceuticals.
   a. TSB may be used during processing, synthesis and extraction of chemicals or ingredients.
   b. TSB may be used in the inks for logos or trade name identification of tablets or capsules.
   c. TSB may be used for printing and labeling of containers and cartons and in the packaging of product.
5. Agriculture.
   a. TSB may be used for blending pesticides such as insecticides like Chloropyrofos into vehicles for application.
   b. TSB facilitates adjustment for spray efficiency and even film application.
6. Food and Drink Industry.
   a. TSB may be used to process oils and flavorings into foods.
   b. TSB may be commonly used to add flavor and essences to liquids and foods.
   c. TSB may be used in inks, and paints for labeling.
   d. TSB may be used for inks and adhesives in packaging cartons, containers.
7. Personal Care Products.
   a. TSB may be used in hairspray and cosmetics.
   b. TSB may be used for fingernail polish and fingernail polish remover.
   c. TSB may be used in specialty formulas of antiseptics.
8. Transportation Industry.
   a. Aircraft, Watercraft, and Automotive cleaners and degreasers.
   b. Windshield deicers, cleaners.
   c. Brake cleaners, hydraulic brake fluid.
   d. Carburetor and fuel injection cleaners
   e. Touch-up spray paint, body, identification and tires.
9. Electronic, Electrical Industry.
   a. TSB can be used as a cleaner of electrical parts, contacts, and hardware used in the electrical industry.
   b. TSB may be used as a safety cleaner, flux remover, etc. on electrical printed circuit boards.
   c. TSB may be used for preparation, cleaning and assembly of computers and/or hardware and printers.
   d. TSB may be packaged in bulk or convenient aerosol packaging.
   e. TSB is an excellent oil and contact cleaner since it evaporates leaving no residual contamination.
10. Aerospace Industry.
   a. TSB may be used for the preparation, cleaning and assembly of precision aerospace parts and assemblies.
   b. TSB may be used to clean machine oils, excessive lubricants, human fingerprints, etc. from delicate parts.
   c. TSB offers convenience in packaging options including aerosol cans.
11. Optics, Optical Lenses, Assemblies.
   a. TSB and TSB compounds may be used as cleaners for lenses and precision optics.
   b. TSB provides convenience and eliminates finger contact via aerosol spray cleaners, leaving no residual.
12. Tanker Bilge and/or Hold Cleaner.
   a. TSB may be used to provide safe, water soluble, biodegradable cleaners for cleaning tanker holds.
   b. TSB may be blended with paraffinic and/or microcrystalline wax(s) residual from crude oil transport, tankers, barges and storage.

With respect to bilge and hold cleaning the tanker holds from varied wax solids is a significant problem. For example, U.S. Navy fuel tankers have a constant problem which requires arduous cleaning and strict attention to the safe removal of residual fuel or oil. Some of the "Bunker Grades" are thick as tar. The clean out process may be achieved by either using TSB blends with water pressure or eliminating water entirely and thus recycling the residual for fuel.

EXAMPLES

The following VOC compounds were formulated according to the invention and compared to the original flash point of the solvent. Each of the test results shown are an average of 3 individual tests. In some cases, this resulted in a reclassification of a number of Class I VOC's to Class II compounds in accordance with US EPA standards for volatile/flammable materials. "IFF" stands for the supplier Fragrances and Flavors, Inc. and "Mill" stands for the supplier Millennium Chemicals, Inc.

1) VOC is Tert Butyl Acetate (pure compound flash point is 40.0° F.)

| | | | |
|---|---|---|---|
| a) Tert Butyl Acetate | 98.0% | b) Tert Butyl Acetate | 98.0% |
| Mill 350 | 2.0% | IFF A Jax | 2.0% |
| Flash point: 118° F. | | Flash point: 118° F. | |
| c) Tert Butyl Acetate | 98.0% | d) Tert Butyl Acetate | 97.0% |
| IFF Linalool | 2.0% | Mill 350 | 1.5% |
| Flash point: 115° F. | | IFF A Jax | 1.5% |
| | | Flash point: 122° F. | |

As can be seen from the foregoing data, the combination of two terpineols produced a higher flash point than did those combinations using only a single terpene alcohol.

2) VOC is Methyl Amyl Ketone (pure compound flash point is 102° F.)

| | | | |
|---|---|---|---|
| a) Methyl Amyl Ketone | 98.0% | b) Methyl Amyl Ketone | 98.0% |
| Mill 350 | 2.0% | IFF A Jax | 2.0% |
| Flash point: 118° F. | | Flash point: 118° F. | |
| c) Methyl Amyl Ketone | 98.0% | d) Methyl Amyl Ketone | 97.0% |
| IFF Linalool | 2.0% | Mill 350 | 1.5% |
| Flash point: 115° F. | | IFF A Jax | 1.5% |
| | | Flash point: 122° F. | |

As can be seen from the foregoing data, the combination of two terpineols produced a higher flash point than did those combinations using only a single terpene alcohol.

3) VOC is Methyl acetate (pure compound flash point is 15.8° F.)

| | | | |
|---|---|---|---|
| a) Methyl acetate | 98.0% | b) Methyl acetate | 98.0% |
| Mill 350 | 2.0% | IFF A Jax | 2.0% |
| Flash point: 118° F. | | Flash point: 115° F. | |
| c) Methyl acetate | 98.0% | d) Methyl acetate | 97.0% |
| IFF Linalool | 2.0% | Mill 350 | 1.5% |
| Flash point: 111° F. | | IFF A Jax | 1.5% |
| | | Flash point: 115° F. | |

As can be seen from the foregoing data, with only one exception, the combination of two terpineols produced a higher flash point than did those combinations using only a single terpene alcohol.

4) VOC is Methyl Ethyl Ketone (pure compound flash point is 20° F.)

| | | | |
|---|---|---|---|
| a) Methyl Ethyl Ketone | 98.0% | b) Methyl Ethyl Ketone | 98.0% |
| Mill 350 | 2.0% | IFF A Jax | 2.0% |
| Flashpoint: 111° F. | | Flash point: 108° F. | |
| c) Methyl Ethyl Ketone | 98.0% | d) Methyl Ethyl Ketone | 97.0% |
| IFF Linalool | 2.0% | Mill 350 | 1.5% |
| Flash point: 108° F. | | IFF A Jax | 1.5% |
| | | Flash point: 111° F. | |

As can be seen from the foregoing data, the combination of two terpineols produced a higher flash point, or in one sample, the same, than did those combinations using only a single terpene alcohol.

Example of an Industrial Formulation

1) Wood and Concrete sealer, High Flash, Low VOC, Zero HAP.

| Ingredients | Pounds | Gallons | Vendor |
|---|---|---|---|
| Acetone(1) | 395.40 | 60.00 | |
| Pliolite VTAC | 200.00 | 23.20 | Goodyear |
| Methyl Amyl Ketone(2) | 114.24 | 16.80 | |
| Total formula | 709.64 | 100.00 | |

(1)Acetone, 98% wt. Millennium 350 Terpineol, 1% wt. International Flavors and Fragrances, Terpineol Alpha Jax, 1% wt.
(2)Metyl Amyl Ketone, 97% wt. Millennium 350 Terpineol, 1.5% wt. International Flavors and Fragrances, Terpineol Alpha Jax, 1.5% wt.

Formulation Properties

| | |
|---|---|
| Bulk Density | 7.0964 Lbs./Gallon |
| Solids by Weight | 28.2% |
| Solids by volume | 23.2% |
| Flash Point | 118° F./48° C. |
| VOC | 1.14 Lbs./Gal or 137.03 gm./Ltr. |
| HAPS | Zero |
| Dry Time, 4 mils wet. | 20 minutes, 77° F./25° C. |

As can be seen from the foregoing application of the invention, the flash point of the final formulation has been raised from 0° F. (acetone)/102° F. (methyl amyl ketone) to a higher level of 118° F. with a minimal loading of two terpene alcohols. One would think that by blending these two solvents with such disparate individual flash points that the resulting flash point would be somewhere between 0° F. and 102° F. However, surprisingly, by combining these two solvents, the final formulation has moved from what would have been a Class I compound to become a Class II compound. By increasing the flash point of the final composition, an expanded variety of uses, including shipping restrictions and storage requirements, as shown above, are now available to solvents that would have been previously and, in some cases, still exempt due to their high volatilities.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of raising the flash point of a volatile organic compound comprising:

determining a combined amount of two or more terpene alcohols from about 0.05 to about 5.0 wt. % based on the total weight of a volatile organic compound and the terpene alcohols such that the addition of the terpene alcohols raises the flash point of the volatile organic compound by at least 20° F.; and adding the combined amount of the two or more terpene alcohols to the volatile organic compound.

2. The method of claim 1, wherein the combined amount of terpene alcohols is from about 2 to about 3 wt. % based on the total weight of the volatile organic compound and the terpene alcohols.

3. The method of claim 1, wherein the terpene alcohols are selected from the group consisting of geraniol, citronellol, nerol, menthol, nerolidol and farnesol.

4. The method of claim 1, wherein each terpene alcohol is present in an amount of from about 0.05 to about 2.0%, by weight, based on the total weight of the volatile organic compound and the terpene alcohols.

5. The method of claim 4, wherein each terpene alcohol is present in an amount of from about 0.5 to about 1.5%, by weight, based on the total weight of the volatile organic compound and the terpene alcohols.

6. The method of claim 1, wherein the terpene alcohols are terpineols.

7. The method of claim 1, wherein the flash point of the volatile organic compound is about 40° F. or less and the addition of the terpene alcohols raises the flash point to at least about 122° F.

8. The method of claim 1, wherein the flash point of the volatile organic compound is about 20° F. or less and the addition of the terpene alcohols raises the flash point to at least about 111° F.

9. The method of claim 1, wherein the flash point of the volatile organic compound is about 16° F. or less and the addition of the terpene alcohols raises the flash point to at least about 115° F.

10. The method of claim 1, wherein the addition of the terpene alcohols raises the flash point of the volatile organic compound to at least 111° F.

* * * * *